Jan. 5, 1926.
G. H. GEHRKING
HARVESTER
Filed Oct. 1, 1924
1,568,450
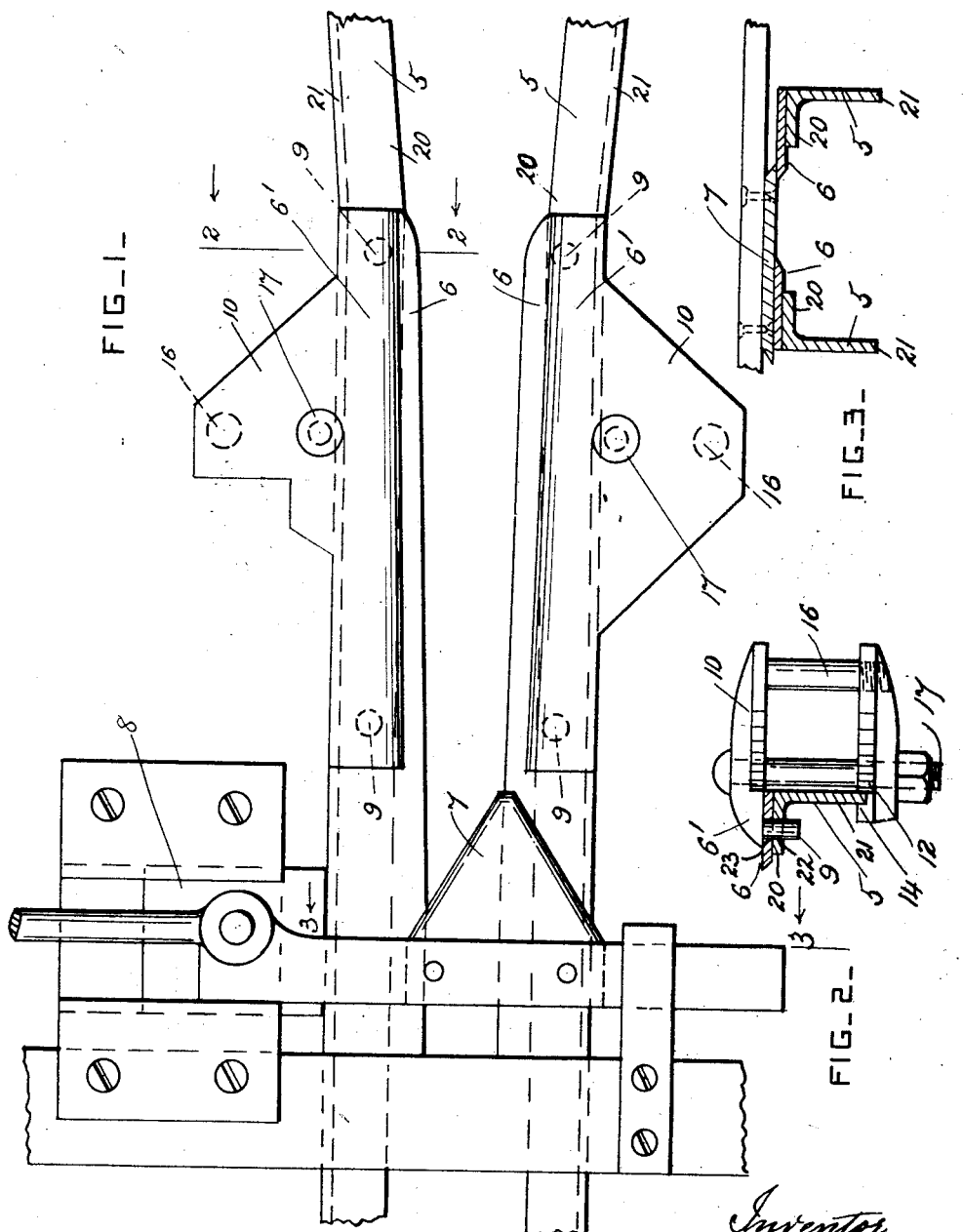

Patented Jan. 5, 1926.

1,568,450

UNITED STATES PATENT OFFICE.

GEORGE H. GEHRKING, OF ELK MOUND, WISCONSIN.

HARVESTER.

Application filed October 1, 1924. Serial No. 740,986.

*To all whom it may concern:*

Be it known that I, GEORGE H. GEHRKING, a citizen of the United States, residing at Elk Mound, in the county of Dunn and State of Wisconsin, have invented certain new and useful Improvements in Harvesters, of which the following is a specification.

This invention relates to harvesters provided with blades for cutting corn stalks; and it consists of certain clamping devices hereinafter fully described and claimed whereby the stationary cutting blades are removably secured to the frame of the machine in front of the sickle.

In the drawings, Figure 1 is a plan view of a portion of the frame of the machine showing the stationary blades and sickle and the novel clamping devices. Fig. 2 is an end view of one stationary blade and its clamping devices showing the frame guide bar in cross-section on the line 2—2 in Fig. 1. Fig. 3 is a section taken on the line 3—3 in Fig. 1.

Harvesting machines of this class are provided with frames having two converging bars which form guides 5 between which the corn stalks pass. These bars are preferably angle-shaped in cross-section. Two stationary cutting blades 6 are secured to the rear end portions of the bars 5 and their cutting edges are arranged at an angle to each other. A sickle 7 is arranged to slide in a sickle head or guide 8 crosswise of the blades 6 and at their rear ends. The stationary blades partially cut through the stalks before they reach the sickle, and the sickle, which is reciprocated in its guide, completes the cutting off operation. All of these parts are of any approved construction.

The stationary blades are usually bolted fast to the guide bars, and are removed with difficulty when they require to be sharpened, and they cannot be sharpened satisfactorily without removing them.

The angle-shaped guides 5 have horizontal members 20 at their tops which project towards each other, to the right and to the left respectively, and they have vertical members 21 which project downwardly from the outer sides of the horizontal members 20 which latter have holes 22 as provided for the usual fastening bolts. According to this invention each cutting blade 6 has an upper plate 6' arranged above it, and each upper plate has positioning pegs 9 on its end portions which are placed in engagement with the bolt holes 23 in the blade 6 and with the holes 22 in the upper and horizontal member 20 of the guide bar, in place of the usual fastening bolts with which the blades are ordinarily bolted to the guides, as hereinbefore described. Each upper plate 6' has also a lug 10 which projects laterally of the vertical member of the guide bar. A plate 12 is arranged under the vertical member of the bar and has a groove 14 which engages with the edge of the vertical member. A distance piece 16 is secured between the lug 10 and plate 12 and is preferably secured to the plate. A clamping bolt 17 is arranged in holes in the lug and plate between the distance piece and the vertical member of the guide bar, and when the nut of this bolt is screwed up it clamps the blade securely to the bar. The blades and their clamping devices are formed right and left hand, but are otherwise alike, and the blades are easily removed for sharpening by removing the single clamping bolt of each clamping device. The lugs 10 project in opposite directions to the right and to the left hand of the plates 6' respectively.

What I claim is:

1. In a corn harvester, the combination, with a pair of guide bars for stalks and a pair of cutting blades mounted on the guide bars, of a pair of clamping devices for the cutting blades formed right and left hand, each clamping device comprising an upper plate arranged above the cutting blade and guide bar and provided with a clamping bolt hole and a laterally projecting lug, a plate arranged below the said guide bar and also provided with a clamping bolt hole and a laterally projecting lug, a distance piece arranged between the laterally projecting lugs, and a clamping bolt engaging with the clamping bolt holes and projecting through the space between the said distance piece and the guide bar.

2. In a corn harvester, guide bars provided with cutting blades and clamping devices for the cutting blades as set forth in claim 1, each upper plate being provided with positioning pegs, and each cutting blade and guide bar being provided with holes for the said pegs to engage in.

3. In a corn harvester, guide bars provided with cutting blades and clamping devices for the cutting blades as set forth in claim 1, each guide bar being angle-shaped in cross-section and having a horizontal member and a vertical member, and each lower plate being provided with a groove which engages with the bottom edge of the vertical member of the guide bar to which it pertains.

In testimony whereof I have affixed my signature.

GEORGE H. GEHRKING.